United States Patent [19]

Samoilovich et al.

[11] 4,406,871

[45] Sep. 27, 1983

[54] PROCESS FOR GROWING DIAMONDS

[76] Inventors: Mikhail I. Samoilovich, ulitsa Krasnoi Molodezhi, 4, kv. 64; Boris I. Zadneprovsky, ulitsa Lenina, 24, kv. 3, both of Alexandrev Vladimirskoi oblasti; Albert V. Nikitin, prospekt Stroitelei, 52, kv. 55, Ivanovo; Jury M. Putilin, ulitsa Revoljutsii, 4, kv. 40; Vladimir M. Radyansky, ulitsa Tereshkovoi, 2, korpus 2, kv. 15, both of Alexandrov Vladimirskoi oblasti; Anatoly A. Shaposhnikov, 5 Vatutinsky pereulok, 31, kv. 10, Moscow, all of U.S.S.R.

[21] Appl. No.: 253,834

[22] PCT Filed: May 30, 1980

[86] PCT No.: PCT/SU80/00083

§ 371 Date: Apr. 30, 1981

§ 102(e) Date: Apr. 20, 1981

[87] PCT Pub. No.: WO81/00560

PCT Pub. Date: Mar. 5, 1981

[30] Foreign Application Priority Data

Aug. 30, 1979 [SU] U.S.S.R. .............................. 2800401

[51] Int. Cl.³ ............................................ C01B 31/06

[52] U.S. Cl. ................................................. 423/446
[58] Field of Search ....................................... 423/446

[56] References Cited

U.S. PATENT DOCUMENTS

| 2,947,609 | 8/1960 | Strong | 423/446 |
|---|---|---|---|
| 2,947,610 | 8/1960 | Hall et al. | 423/446 |
| 2,992,900 | 7/1961 | Bovenkerk | 423/446 |
| 3,597,158 | 8/1971 | Horton | 423/446 |

OTHER PUBLICATIONS

Radyansky et al. "Sverkhtuerdye Materialy" No. 2, Apr. 1979, pp. 8–11.

*Primary Examiner*—Edward J. Meros
*Attorney, Agent, or Firm*—Lilling & Greenspan

[57] ABSTRACT

A process for growing diamonds from carbonaceous compounds at high temperatures and pressures within the range of thermodynamic stability of diamond in the presence of metals-catalysts-solvents and active compounds. As such active compounds use is made of cyanamide and/or its metal derivatives of the first, second or eighth Groups.

The herein-proposed process can be employed for manufacturing diamonds fit for use in the tool-making industry and in solid-state (semiconductor) instruments.

10 Claims, No Drawings

PROCESS FOR GROWING DIAMONDS

FIELD OF THE ART

The present invention relates to processes for crystal growing and, more specifically, to a process for growing diamonds from carbonaceous compounds at high temperatures and pressures within the range of thermodynamic stability of the diamond.

BACKGROUND ART

A process is well known in the art for growing diamonds under pressures and at temperatures corresponding to its thermodynamic stability in the carbon-metal system. In the state diagram of graphite-diamond the range of working pressures is above the equilibrium line for graphite-diamond (range of thermodynamic stability of diamond), wherefore the range of growing temperatures is limited, on the one hand, by the metal melting curve and, on the other hand, by the equilibrium line. In the chamber of a solid-phase high-pressure unit, pressure is created and a container made of an elasto-plastic material (such as lithographic stone) with a reaction space volume of from 1.0 to 3.0 cm$^3$ is placed thereinto. In the reaction space there is present graphite or any other carbonaceous substance and metal-catalyst-solvent. Heating is effected by passing electric current directly through the reaction space on a special heater provided therein. In one of the embodiments the known process stipulates the creation of high temperatures and pressures necessary for the synthesis of diamond within the range of its thermodynamic stability (cf. U.S. Pat. No. 3,124,422, published in 1964).

In this embodiment of the prior art process for growing diamonds the residence of the growth system in the stage of thermodynamic stability of graphite at a temperature exceeding the melting point of the metal-solvent-catalyst is accompanied by the formation of a graphite phase capable of initiating the process of recrystallization of metastable graphite within the range of thermodynamic stability of diamond so as to compete with the diamond-formation process, thus hindering the formation of substantially large (above 0.4 mm) fractions of diamond crystals and limiting the yield of these fractions to 13–15%.

Also known in the art is a process for growing diamonds, wherein, unlike in the above-described process, into the growth system there are added active compounds-nitrides of such metals as titanium, zirconium, hafnium, vanadium, boron, and silicon (see Japanese Pat. No. 4605, published in 1972).

The addition of said active substances contributes to a certain increase in the yields of large size fractions of diamond crystals. However, this increase is limited to several percent of the total weight of the synthesized crystals. The stable yield of large-size (above 0.4 mm) fractions of diamond crystals is, in the discussed embodiment of the process, not more than 20% which is insufficient for their industrial manufacture.

DISCLOSURE OF THE INVENTION

It is an object of the present invention to improve the process for growing diamonds in such a way as to ensure in the course of growing, both suppression of the nucleation process of the metastable graphite phase and limiting the number of diamond phase nuclei, which would lead to an increase in the stable yield of large size (with particle of more than 0.4 mm) fractions of commercially suitable crystals.

This object is accomplished by a process for growing diamonds from carbonaceous substances at high (within the range of thermodynamic stability of diamond) temperatures and pressures in the presence of metals-catalysts-solvents and active compounds. In accordance with the present invention, use is made of cyanamide and/or its metal derivatives of the first, second or eighth Groups.

It is preferable that the process for growing diamonds be effected using, as the carbonaceous substance, graphite and, as metals-catalysts-solvents-manganese and nickel taken in the ratio of 6:4. Active compounds should be preferably added in an amount of from 0.05 to 1.5% by weight and the growing should be carried out under a pressure of from 43 to 45 kbar and at a temperature of from 1,250° to 1,350° C.

To shorten the time for the synthesis of diamond crystals active substances can be used as part of the carbonaceous ingredient.

To lower the number of inclusions in the obtained crystals it is desirable that the growing be conducted in the presence of low-melting metals of Groups 3 and 4 taken in an amount of from 0.05 to 5% by weight.

To increase strength of the resulting diamond crystals it is advisable that the growing be conducted in the presence of high-melting oxides of metals of Groups 2 or 4 taken in an amount of from 0.5 to 2.5% by weight.

The advantage of the present process for growing diamonds resides in increasing, up to 45%, of the stable yield of large size (above 0.4 mm) qualitative fractions of commercially suitable crystals.

BEST MODES OF CARRYING OUT THE INVENTION

The present invention is further illustrated by the following detailed description of some embodiments thereof.

The process for growing crystals of diamonds according to the present invention is performed in the following manner.

Into a container with a heater provided therein, for example, a graphite heater, there is placed a charge composed of metals-solvents-catalysts taken in different proportions. Such metals are nickel, iron, cobalt, manganese, copper and some others. The charge is mixed with the additive of an active compound - cyanamide and/or its metallic substituted derivatives of Groups I, II or VIII in specific concentrations.

The metal substituted derivatives of cyanamide use can be made of cyanamides of copper, calcium, magnesium, cobalt, nickel and iron.

Into a container there are also placed carbonaceous substances which can fill the container volume both uniformly or layer-after-layer with the metal charge. In so doing use is made of various grades of graphite or graphite partly enriched with active compounds selected from the above-specified group. This makes it possible to increase the rate of growth of diamond crystals, though the quality of the resulting crystals is somewhat lowered. Thereafter, the container is placed into a high-pressure chamber and heating is effected by passing electric current through the heater. Taking into account of the melting point the chosen composition of metals-solvents-catalysts, the container is subjected to the effect of temperatures and pressures falling within the range of thermodynamic stability of the diamond.

The selected parameters (temperature, pressure) are maintained for a period of from several minutes to several hours (depending on the requirements imposed on the size and quantity of crystals). After lowering the growth parameters (temperature, pressure to normal room temperatures and pressures) the obtained diamonds are extracted from the resulting cake.

The process according to the present invention can be most effectively realized if graphite is used as the carbonaceous substance and the metal-catalyst-solvent is made of manganese and nickel taken in the ratio of 6:4. The active compounds are added in an amount of from 0.05 to 1.5% by weight and the crystal growing is conducted under a pressure of from 43 to 45 kbar at a temperature within the range of from 1,250° to 1,350° C.

The quality of the resulting crystals can be improved by lowering the rate of crystal growth and, hence, the number of inclusions entrained therewith, as well as by introducing low-melting metals of Group 3 or 4 into the container, for example In, Pb, Ge, Sn in an amount of from 0.05 to 5% by weight and oxides of high-melting metals of Group 2 or 4, for example MgO, $TiO_2$ taken in an amount of from 0.5 to 2.5%.

For a better understanding of the present invention some specific examples are given hereinbelow by way of illustration of its particular embodiments.

EXAMPLE 1

The charge is used containing Mn:Ni in the ratio of 6:4, graphite as the source of carbon, cyanamide as the active additive in the amount of 0.05% by weight. Growing is effected at a temperature of 1,250° C. under a pressure of 43.5 kbar.

Cakes are thus obtained with the yield of commercially suitable diamond grains with a size above 0.4 mm equal to 30–35%.

EXAMPLE 2

The charge is used containing Mn:Ni taken in a ratio of 6:4, graphite as the source of carbon in a mixture with calcium cyanamide (in the ratio of 4:1). The synthesis is conducted at a temperature of 1,300° C. under a pressure of 44.5 kbar.

Cakes are obtained having a yield of commercially suitable diamond grains with a size above 0.4 mm equal to 32–35%.

EXAMPLE 3

A charge is used containing Mn, Ni and Cu in a ratio of 2:1:1, with graphite as the source of carbon calcium cyanamide is added to the growth system in an amount of 0.7% by weight and metallic In in the amount of 3% by weight. The synthesis is conducted at a temperature of 1,340° C. under a pressure of 45 kbar.

Cakes are thus obtained with a yield of commercially suitable diamond grains of a size above 0.5 mm equal to 30–33% and the amount of inclusions in the crystals is by 30% lower than in Examples 1 and 2.

EXAMPLE 4

A charge is used containing Mn, Ni and Co in the ratio of 6:4:1, with graphite as the source of carbon. Copper cyanamide is added to the growth system in an amount of 1.4% by weight and metal oxide MgO in an amount of 1.5% by weight. The synthesis is conducted at a temperature of 1,300° C. under a pressure of 45 kbar.

Cakes are thus obtained with the yield of commercially suitable diamond grains of a size above 0.4 mm equal to 31–34%. The crystal strength is 15% higher compared to the diamonds produced in Examples 1 and 2.

EXAMPLE 5

A charge is used containing Mn and Ni in a ratio of 6:4, with graphite as the source of carbon, and calcium cyanamide in an amount of 0.8% by weight acts as the active compound additive. The synthesis is conducted as a temperature of 1,300° C. under a pressure of 44 kbar.

Cakes are obtained with a yield of commercially suitable diamond grains of a size above 0.4 mm equal to 42–45%.

EXAMPLE 6

The charge employed contains Mn, Ni and Fe in a ratio of 6:4:1, with graphite as the carbon source. Cobalt cyanamide is used as the active compound in the amount of 1.5% by weight and metallic Sn in the amount of 0.06% by weight. The synthesis is conducted at a temperature of 1,350° C. under a pressure of 45 kbar.

Obtained are cakes with a yield of commercially suitable diamond grains with a size of above 0.4 mm equal to 22–25%.

EXAMPLE 7

The charge employed contains Mn and Ni in a ratio of 6:4, with graphite as the cource of carbon. Calcium cyanamide is added to the growth system in an amount of 0.06% by weight and MgO oxide in an amount of 0.5% by weight. The synthesis is conducted at a temperature of 1,250° C. under a pressure of 43 kbar.

The resulting cakes have a yield of commercially suitable diamond grains with a size above 0.4 mm equal to 30–33%. The mechanical strength of the crystals is 10% higher as compared to the diamonds obtained in Examples 1 and 2.

EXAMPLE 8

The charge employed contains Mn, Ni and Co in a ratio of 6:4:1, with graphite as the source of carbon. Calcium cyanamide is added to the growth system in an amount of 0.05% by weight and MgO in an amount of 2.3% by weight. The synthesis is conducted at a temperature of 1,300° C. under a pressure of 43 kbar.

The resulting cakes have a yield of commercially suitable diamond grains of a size above 0.4 mm equal to 32–35%, the mechanical strength of the resulting crystals is 15% higher compared to the diamonds produced in Examples 1 and 2.

EXAMPLE 9

The charge employed contains Mn and Ni in a ratio of 6:4, with graphite as the source of carbon. To the growth system there is added 0.5% by weight of a mixture of cyanamide and calcium cyanamide in the ratio of 1:1 and metallic In in an amount of 5% by weight. The synthesis is conducted at a temperature of 1,250° C. under a pressure of 44 kbar.

The resulting cakes contain commercially suitable diamond grains with a size of above 0.4 mm in the yield of from 30 to 35%.

INDUSTRIAL APPLICABILITY

The process for growing diamonds can be advantageously employed in the manufacture of diamonds suitable for application in the tool-making industry and in solid-state (semiconductor) instruments.

What we claim is:

1. In a process for growing diamonds from carbonaceous substances at elevated temperatures and pressures within the range of thermodynamic stability of the diamond, in the presence of solvent-catalyst metals, the improvement which comprises:

effecting the growing of said diamonds in the presence of an active additive selected from the group consisting of cyanamide, at least one of its metal derivatives in Groups 1, 2 and 8 of the Periodic Table, and mixtures thereof.

2. The process of claim 1, wherein said carbonaceous substance is graphite, and said solvent-catalyst metal comprises manganese and nickel in a ratio of 6:4, respectively.

3. The process of claim 1, wherein said solvent-catalyst metal is selected from the group consisting of nickel, iron, cobalt, manganese, copper, and mixtures thereof.

4. The process of any of claims 1, 2 or 3, wherein said active additive is added in an amount from 0.05 to 1.5% by weight, the pressure varies from 43 to 45 kbar and the temperature varies from 1,250° C. to 1,350° C.

5. The process of claim 4, wherein the active additive is used as part of the carbonaceous substance.

6. The process of claim 4, wherein the growing is effected in the presence of at least one low melting metal selected from Group 3 or 4 of the Periodic Table, and mixtures thereof, in amounts varying from 0.05 to 5% by weight.

7. The process of claim 6, wherein said low melting metal is selected from the group consisting of indium, lead, germanium, tin, and mixtures thereof.

8. The process of claim 4, wherein the growing is effected in the presence of at least one oxide of a higher melting metal selected from Group 2 or 4 of the Periodic Table, in amounts varying from 0.5 to 2.5% by weight.

9. The process of claim 8, wherein said oxide is selected from the group consisting of magnesium oxide and tin oxide, and mixtures thereof.

10. The process of claim 4, wherein said metal derivatives of cyanamide are selected from the group consisting of copper, calcium, magnesium, cobalt, nickel, iron, and mixtures thereof.

* * * * *